United States Patent
Kim et al.

(10) Patent No.: US 9,540,182 B2
(45) Date of Patent: Jan. 10, 2017

(54) ABRASION-DETECTION TYPE CONVEYOR BELT AND MANUFACTURING METHOD THEREOF

(71) Applicants: HWASEUNG EXWILL CO., LTD., Busan (KR); HYUNDAI STEEL COMPANY, Incheon (KR)

(72) Inventors: Jong Woo Kim, Busan (KR); Un Jung Lee, Busan (KR); Dae Myung Lim, Yangsan (KR); Sang Su Bae, Busan (KR); Jeong Hyeon Seo, Dangjin (KR); Sang Bong Lee, Pyeongtaek (KR); Jai Joon Song, Seoul (KR); Min Heo, Seongnam (KR); Tae Min Jeong, Dangjin (KR); Seung Young Shin, Dangjin (KR)

(73) Assignees: HWASEUNG EXWILL CO., LTD., Busan (KR); HYUNDAI STEEL COMPANY, Incheon (KR)

( * ) Notice: Subject to any disclaimer, the term of this patent is extended or adjusted under 35 U.S.C. 154(b) by 0 days.

(21) Appl. No.: 14/936,508

(22) Filed: Nov. 9, 2015

(65) Prior Publication Data

US 2016/0362252 A1   Dec. 15, 2016

(30) Foreign Application Priority Data

Jun. 9, 2015 (KR) .......................... 10-2015-0081324

(51) Int. Cl.
*B65G 43/02* (2006.01)
*B32B 25/04* (2006.01)
*B65G 15/32* (2006.01)
*B65G 15/34* (2006.01)
*B32B 25/00* (2006.01)

(52) U.S. Cl.
CPC ............... *B65G 43/02* (2013.01); *B32B 25/00* (2013.01); *B32B 25/04* (2013.01); *B65G 15/32* (2013.01); *B65G 15/34* (2013.01)

(58) Field of Classification Search
CPC ......... B65G 15/34; B65G 43/02; B32B 25/00; B32B 25/04
See application file for complete search history.

(56) References Cited

U.S. PATENT DOCUMENTS

| | | | | |
|---|---|---|---|---|
| 2,824,038 | A * | 2/1958 | Wilson | B32B 25/00 156/334 |
| 4,371,411 | A * | 2/1983 | Honda | B32B 25/04 152/565 |
| 4,567,088 | A * | 1/1986 | Skogman | B32B 27/08 428/213 |
| 5,393,816 | A * | 2/1995 | Kondo | B29C 33/722 524/247 |

(Continued)

*Primary Examiner* — Thomas Randazzo

(57) ABSTRACT

Provided are an abrasion-detection type conveyor belt and a manufacturing method thereof. A polymer composition ratio of is set to 40-60% of styrene-butadiene rubber (SBR) and 60-40% of natural rubber (NR), and an adhesive strength between a cover rubber layer and an abrasion-detection color layer is set to 13 kN/m (33 kgf/inch). As compared to the existing product, material properties of the abrasion-detection color layer are improved to extend the available life of the abrasion detection type conveyor belt. The abrasion-detection type conveyor belt is cost-effective, simplifies a belt line, and reduces an inspection time.

3 Claims, 4 Drawing Sheets

(56) References Cited

U.S. PATENT DOCUMENTS

| | | | | |
|---|---|---|---|---|
| 5,736,472 | A * | 4/1998 | Mahn, Jr. | B29C 37/0082 |
| | | | | 428/492 |
| 6,485,820 | B1 * | 11/2002 | Michaud | B32B 25/10 |
| | | | | 428/131 |
| 6,736,174 | B2 * | 5/2004 | Inoue | B60C 9/00 |
| | | | | 152/154.2 |
| 6,769,746 | B2 * | 8/2004 | Rodgers | B62D 55/244 |
| | | | | 305/165 |
| 7,163,736 | B2 * | 1/2007 | Takahashi | D02G 3/48 |
| | | | | 152/451 |
| 8,002,659 | B2 * | 8/2011 | Ichiba | F16G 1/00 |
| | | | | 474/205 |
| 8,207,247 | B2 * | 6/2012 | Ignatz-Hoover | C08J 3/203 |
| | | | | 523/351 |
| 2009/0194225 | A1 * | 8/2009 | Ikuta | B60C 1/00 |
| | | | | 156/123 |
| 2012/0034486 | A1 * | 2/2012 | Nakano | B29D 29/06 |
| | | | | 428/608 |
| 2015/0034458 | A1 * | 2/2015 | Burrowes | B65G 15/36 |
| | | | | 198/847 |
| 2015/0300959 | A1 * | 10/2015 | Smith | B32B 25/16 |
| | | | | 356/237.1 |
| 2016/0001512 | A1 * | 1/2016 | Sakaguchi | B65G 15/34 |
| | | | | 156/60 |
| 2016/0032151 | A1 * | 2/2016 | Uang | C09J 107/00 |
| | | | | 428/201 |
| 2016/0096684 | A1 * | 4/2016 | Sasakuma | C08K 3/0025 |
| | | | | 198/847 |

* cited by examiner

FIG. 5

```
┌─────────────────────────────────────────────────────────────────┐
│  ┌──────────────────────────────┐                               │
│  │ ELECTRONIC DOCUMENT SERVICE  │                               │
│  └──────────────────────────────┘                               │
│                      TEST REPORT                                │
│                                         3539-6920-9477-4577     │
│  1. REPORT NO. CT15-051639                                      │
│  2. REQUESTER                                                   │
│     ○ Company Name:  HWASEUNG EXWILL CO., LTD.                  │
│     ○ Address:       7,8F, Changchun B·D, 1079, Jungang-daero,  │
│                      Yeonje-gu, Busan, Korea                    │
│     ○ Request Date:  2015. 04. 30.                              │
│     ○ Test period:   2015. 04. 30 - 2015. 05. 14.               │
│  3. PURPOSE OF TEST REPORT: Submission to Client.               │
│  4. SAMPLE NAME: Color topping (yellow), existing topping (black).│
│  5. TEST METHOD                                                 │
│     (1) KS M 6549:2008         (2) KS M 6518:2006               │
│     (3) KS M 6534:2011                                          │
│                                                                 │
├──────────────┬──────────────────────┬───────────────────────────┤
│ Confirmation │ Drafter  Huh Junyeong│ Chief technology officer  │
│              │                      │       Moon Byeonggeun     │
├──────────────┴──────────────────────┴───────────────────────────┤
│ Note: 1. This report is the test result based on sample and     │
│ sample name provided by the requester and does not guarantee    │
│ the quality of the entire product.                              │
│       2. This report cannot be used for promotion, propaganda,  │
│ advertisement, and lawsuit and should not be used for anything  │
│ other than the above-mentioned purpose.                         │
│                          May 14, 2015                           │
│                   Korean Conformity Laboratories                │
├─────────────────────────────────────────────────────────────────┤
│ Gasan Laboratory: 199, Gasan Digital 1-ro, Gasan-dong,          │
│ Geumcheon-gu, Seoul, 153-803, Korea 02-2102-2500                │
│ Contact: Fiber Polymer Team Tel. (02)2102-2683                  │
│                                                                 │
│                       1 of total 2 pages      FORM.QP-20-01-05(2)│
└─────────────────────────────────────────────────────────────────┘
```

FIG. 6

ELECTRONIC DOCUMENT SERVICE

TEST REPORT

REPORT NO. CT15-051639

6. TEST RESULT

1) Color Topping (yellow)

| Test Item | Unit | Test Method | Test Result | Test Environment |
|---|---|---|---|---|
| Specific gravity | - | (1) | 1.46 | - |
| Hardness (Type A) | - | (2) | 61 | (23±1)°C, (50±2)%R.H. |
| Tensile strength (Test piece: dumbbell type No. 3) | MPa | (2) | 13.5 | (23±1)°C, (50±2)%R.H. |
| Elongation rate | % | (2) | 610 | (23±1)°C, (50±2)%R.H. |
| Cover rubber - abrasion test (abrasion amount) | $mm^3$ | (3) | 339 | (23±2)°C, (43±3)%R.H. |
| Adhesion test - adhesive strength (upper rubber + belting fabric): average value | kN/m | (3) | 16.10 | (23±1)°C, (50±2)%R.H. |
| Adhesion test - adhesive strength (upper rubber + belting fabric): minimum value | kN/m | (3) | 15.87 | (23±1)°C, (50±2)%R.H. |

2) Existing Topping (black)

| Test Item | Unit | Test Method | Test Result | Test Environment |
|---|---|---|---|---|
| Specific gravity | - | (1) | 1.37 | - |
| Hardness (Type A) | - | (2) | 62 | (23±1)°C, (50±2)%R.H. |
| Tensile strength (Test piece: dumbbell type No. 3) | MPa | (2) | 7.4 | (23±1)°C, (50±2)%R.H. |
| Elongation rate | % | (2) | 300 | (23±1)°C, (50±2)%R.H. |
| Cover rubber - abrasion test (abrasion amount) | $mm^3$ | (3) | 418 | (23±2)°C, (43±3)%R.H. |
| Adhesion test - adhesive strength (upper rubber + belting fabric): average value | kN/m | (3) | 7.10 | (23±1)°C, (50±2)%R.H. |
| Adhesion test - adhesive strength (upper rubber + belting fabric): minimum value | kN/m | (3) | 7.05 | (23±1)°C, (50±2)%R.H. |

- Intentionally left blank -

ABRASION-DETECTION TYPE CONVEYOR BELT AND MANUFACTURING METHOD THEREOF

CROSS-REFERENCE(S) TO RELATED APPLICATION

This application claims priority of Korean Patent Application No. 10-2015-0081324 filed on Jun. 9, 2015 in the Korean Intellectual Property Office, which is hereby incorporated by reference in its entirety.

BACKGROUND OF THE INVENTION

Field of the Invention

The present invention relates to a conveyor belt with an abrasion-detection color layer, and more particularly, to an abrasion-detection type conveyor belt and a manufacturing method thereof, in which a polymer composition ratio of an abrasion-detection color layer is set to 40-60% of styrene-butadiene rubber (SBR) and 60-40% of natural rubber (NR), an adhesive strength between a cover rubber layer and the abrasion-detection color layer is set to 13 kN/m (33 kgf/inch), and material properties of the abrasion-detection color layer (color topping layer) are improved to specific values, thereby extending the available life of the conveyor belt.

Description of the Related Art

In general, a belt conveyor is an apparatus that continuously conveys various conveyance target objects put on a belt by circulating the belt made of a rubber, a fabric, a wire mesh, or a steel plate. A side of the belt has a closed curve, is hung on a pulley, and is driven by rotating the pulley by a motor.

FIG. 1 is a perspective view of a conventional conveyor belt.

As shown in FIG. 1, the conventional conveyor belt 10 inevitably generates abrasion due to a friction with a conveyance target object. In particular, the conventional conveyor belt 10 generates friction relatively seriously in a steel factory where a conveyance target object such as iron ore is conveyed.

FIG. 2 is a sectional view of the conventional conveyor belt.

As shown in FIG. 2, the conventional conveyor belt 10 includes a cover rubber layer 11 made of a rubber material, and a carcass 12 inserted into the cover rubber layer 11.

Since the carcass 12 is inserted into an inner lower portion of the cover rubber layer 11, a thickness between the carcass 12 and an upper surface of the belt contacting the conveyance target object becomes an actually available thickness T.

In the conventional conveyor belt 10, as the belt use time increases, the actually available thickness T between the upper surface of the belt and the carcass 12 is reduced by friction in the process of carrying the conveyance target object such as iron ore. In order to prevent an accident caused by the breaking of the belt, it is necessary to detect the reduction in the actually available thickness T and replace the belt.

As for a method of determining a replacement time of the conveyor belt 10, an upper surface of the belt is cut using a tool such as a knife by an operator's experience, and a remaining thickness T between the upper surface of the belt and the carcass 12 is measured using a measurement tool.

However, it is very unreasonable because the operator partially damages the upper surface of the belt so as to measure the abrasion thickness of the belt. In addition, the damaged portion may be expanded during the operation of the conveyor belt, and oil or the like may be introduced into the damaged portion, thus rapidly shortening the available life of the conveyor belt.

Furthermore, in the past, since the abrasion state of the belt cannot be detected with the naked eye, the replacement and repair time of the conveyor belt may not correctly checked. Consequently, the conveyor belt facility may not be managed properly.

In order to solve such problems, Korean Patent Registration No. 20-0434265 discloses a technology that can detect the abrasion of the belt.

However, the technology disclosed in Korean Patent Registration No. 20-0434265 has practical limitations to actual application.

When the technology disclosed in Korean Patent Registration No. 20-0434265 is actually applied, the life of the belt may be shortened because a color rubber has lower material properties than a general black rubber. In addition, since the unit price of the color rubber is higher than the general black rubber, cost effectiveness may be lowered.

SUMMARY OF THE INVENTION

In order to solve the above-described problems, the present invention is directed to provide an abrasion-detection type conveyor belt and a manufacturing method thereof, in which a polymer composition ratio of an abrasion-detection color layer is set to 40-60% of styrene-butadiene rubber (SBR) and 60-40% of natural rubber (NR), an adhesive strength between a cover rubber layer and the abrasion-detection color layer is set to 13 kN/m (33 kgf/inch), and material properties of the abrasion-detection color layer are improved to specific values, thereby extending the available life of the conveyor belt.

According to an aspect of the present invention, a method of manufacturing an abrasion-detection type conveyor belt includes: forming a cover rubber layer, a carcass inserted into the cover rubber layer, and an abrasion-detection color layer in a middle of the cover rubber layer, wherein the abrasion-detection color layer is formed by setting a polymer composition ratio to 40-60% of styrene-butadiene (SBR) and 60-40% of natural rubber (NR).

An adhesive strength between the cover rubber layer and the abrasion-detection color layer may be set to 13 kN/m (33 kgf/inch).

The abrasion-detection color layer may have at least one of material properties selected from a hardness (Shore-A) of 59 to 61, an elongation rate of 610 to 700%, a tensile strength of 13.5 to 14.0 MPa, a specific gravity of 1.36 to 1.46 g/cm$^3$, and an abrasion amount of 300 to 320 mm$^3$.

In a abrasion-detection type conveyor belt manufactured by the above-described method, a polymer composition ratio of an abrasion-detection color layer is set to 40-60% of styrene-butadiene rubber (SBR) and 60-40% of natural rubber (NR), an adhesive strength between a cover rubber layer and the abrasion-detection color layer is set to 13 kN/m (33 kgf/inch), and material properties of the abrasion-detection color layer are improved to thereby extend the available life of the conveyor belt.

BRIEF DESCRIPTION OF THE DRAWINGS

FIGS. 5 and 6 show test reports of Korean Conformity Laboratories.

DETAILED DESCRIPTION OF EXEMPLARY EMBODIMENTS

Hereinafter, an abrasion-detection type conveyor belt and a manufacturing method thereof according to preferred embodiments of the present invention will be described in detail with reference to the accompanying drawings.

Figure 1:
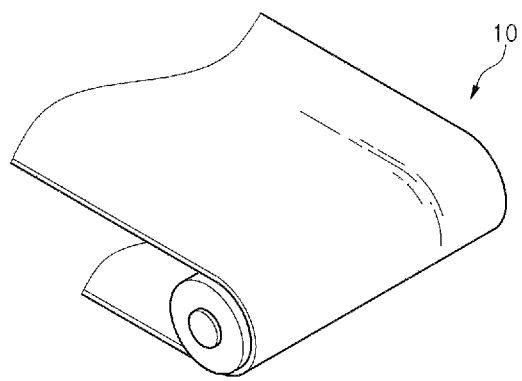
FIG. 1 is a perspective view of a conventional conveyor belt.
Figure 2:
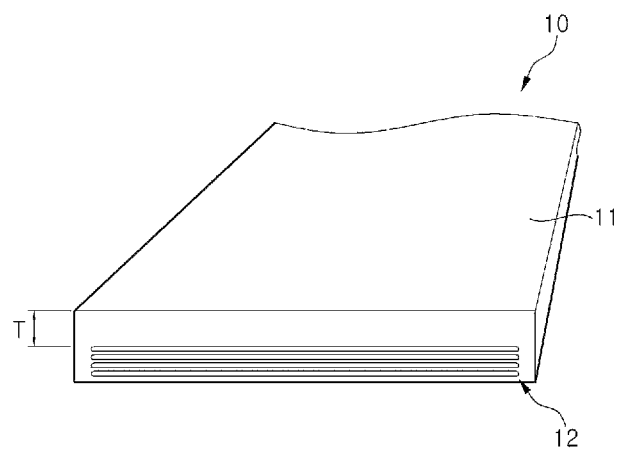
FIG. 2 is a sectional view of the conventional conveyor belt.
Figure 3:
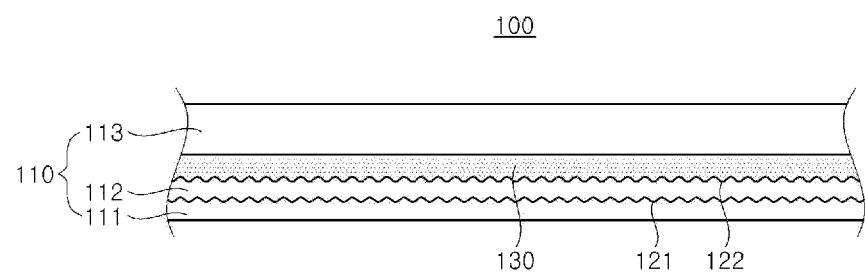
FIG. 3 is a sectional view of an abrasion-detection type conveyor belt according to the present invention.
Figure 4:
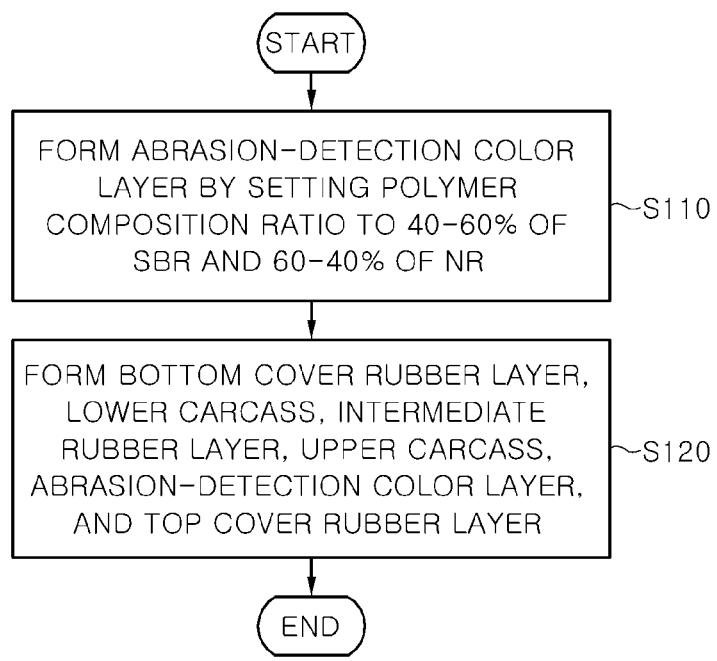
FIG. 4 is a flowchart of a method of manufacturing an abrasion-detection type conveyor belt according to the present invention.

FIG. 3 is a sectional view of an abrasion-detection type conveyor belt according to the present invention, and FIG. 4 is a flowchart of a method of manufacturing an abrasion-detection type conveyor belt according to the present invention.

Referring to FIGS. 3 and 4, an abrasion-detection type conveyor belt 100 according to a preferred embodiment of the present invention may has a structure in which a lower carcass 121, an intermediate cover rubber layer 112, an upper carcass 122, an abrasion-detection color layer 130, and a top cover rubber layer 113 are sequentially stacked on a bottom cover rubber layer 111. The bottom cover rubber layer 111, the intermediate cover rubber layer 112, and the top cover rubber layer 113 are collectively referred to as a cover rubber layer 110. The abrasion-detection color layer 130 may be set to a yellow color.

In the abrasion-detection type conveyor belt, a polymer composition ratio of the abrasion-detection color layer 130 is set to 40-60% of styrene-butadiene rubber (SBR) and 60-40% of natural rubber (NR), an adhesive strength between the cover rubber layer 110 and the abrasion-detection color layer 130 is set to 13 kN/m (33 kgf/inch), and the material properties of the abrasion-detection color layer 130 are improved to thereby extend the available life of the abrasion-detection type conveyor belt.

The method of manufacturing the abrasion-detection type conveyor belt according to the preferred embodiment of the present invention includes forming a cover rubber layer 110, carcasses 121 and 122 inserted into the cover rubber layer 130, and an abrasion-detection color layer 130 in the middle of the cover rubber layer 110, wherein the abrasion-detection color layer 130 is formed by setting a polymer composition ratio to 40-60% or SBR and 60-40% of NR.

An adhesive strength between the cover rubber layer 110 and the abrasion-detection color layer 130 may be set to 13 kN/m (33 kgf/inch).

Material properties of the abrasion-detection color layer 130 may have at least one selected from a hardness (Shore-A) of 59 to 61, an elongation rate of 610 to 700%, a tensile strength of 13.5 to 14.0 MPa, a specific gravity of 1.36 to 1.46 g/cm3, and an abrasion resistance (abrasion amount) of 300 to 320 mm³.

FIGS. 5 and 6 show test reports of Korean Conformity Laboratories.

It can be seen from FIGS. 5 and 6 that the material properties of the abrasion-detection color layer (color topping, yellow) formed by the manufacturing method according to the present invention are much more excellent than the conventional product (existing topping, black) in view of the test items of Table 1 below.

| Test item | Test result of present invention | Test result of conventional product | Unit |
|---|---|---|---|
| Specific gravity | 1.46 | 1.37 | — |
| Shore-A | 61 | 62 | — |
| Tensile strength | 13.5 | 7.4 | MPa |
| Elongation rate | 610 | 300 | % |
| Abrasion amount of cover rubber | 319 | 418 | mm³ |
| Adhesive strength (Upper Cover + Belting fabric) (average) | 16.10 | 7.10 | kN/m |
| Adhesive strength (upper layer + Belting fabric) (Minimum value) | 15.87 | 7.05 | kN/m |

As can be seen from Table 1 above, the abrasion-detection color layer (color topping, yellow) according to the present invention was similar to the conventional product (existing topping, black) in terms of the hardness and was higher in terms of the specific gravity, the tensile strength, the elongation rate, the abrasion amount, and the adhesive strength.

It was confirmed that the abrasion-detection color layer (color topping, yellow) was more excellent than the conventional product (existing topping, black) in terms of the elongation rate, the tensile strength, the abrasion resistance (abrasion amount), and the adhesive strength, and the hardness and the specific gravity are appropriate without being excessively higher or lower.

As described above, the polymer composition ratio of the abrasion-detection color layer is set to 40-60% of styrene-butadiene rubber (SBR) and 60-40% of natural rubber (NR), the adhesive strength between the cover rubber layer and the abrasion-detection color layer is set to 13 kN/m (33 kgf/inch), and the material properties of the abrasion-detection color layer are improved to thereby extend the available life of the conveyor belt.

Since the material properties are remarkably improved and the available life of the conveyor belt is extended as compared to the conventional product, the conveyor belt according to the present invention is cost-effective, can simplify the belt line, and reduce an inspection time.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

100: abrasion-detection type conveyor belt
110: cover rubber layer
111: bottom cover rubber layer
112: intermediate cover rubber layer
113: top cover rubber layer
121: lower carcass
122: upper carcass
130: abrasion-detection color layer

What is claimed is:

1. An abrasion-detection type conveyor belt comprising:
   a cover rubber layer including a top cover rubber layer, an intermediate cover rubber layer, and a bottom cover rubber layer;
   carcasses inserted into the cover rubber layer, the carcasses having wavelike shapes; and an abrasion-detection-color layer disposed between the intermediate cover rubber layer and the top cover rubber layer, wherein the abrasion-detection color layer is formed by setting a polymer composition ratio to 40%-60% of styrene-butadiene (SBR) and 60%-40% of natural rubber (NR).

2. The abrasion-detection type conveyor belt according to claim 1, wherein an adhesive strength between the cover rubber layer and the abrasion-detection color layer is set to be more than or equal to 13 kN/m (33 kgf/inch).

3. The abrasion-detection type conveyor belt according to claim 1, wherein the abrasion-detection color layer has at least one of material properties selected from a hardness (Shore-A) of 59 to 61, an elongation rate of 610% to 700%, a tensile strength of 13.5 MPa to 14.0 MPa, a specific gravity of 1.36 g/cm$^3$ to 1.46 g/cm$^3$, and an abrasion amount of 300 mm$^3$ to 320 mm$^3$.

* * * * *